(12) United States Patent
Metzler

(10) Patent No.: US 8,412,415 B2
(45) Date of Patent: Apr. 2, 2013

(54) IMPACT DETECTION ARRANGEMENT

(75) Inventor: Jurgen Metzler, Gaggenau (DE)

(73) Assignee: Dr. Ing. h.c.f. Porsche Aktiengesellschaft (DE)

( * ) Notice: Subject to any disclaimer, the term of this patent is extended or adjusted under 35 U.S.C. 154(b) by 199 days.

(21) Appl. No.: 12/402,517

(22) Filed: Mar. 12, 2009

(65) Prior Publication Data
US 2009/0254238 A1 Oct. 8, 2009

(30) Foreign Application Priority Data

Apr. 4, 2008 (DE) .......................... 10 2008 017 246

(51) Int. Cl.
B60R 21/33 (2006.01)
(52) U.S. Cl. .................. 701/45; 296/146.6; 296/187.12
(58) Field of Classification Search .................... 701/45; 340/436; 702/47, 50, 98, 138; 296/146.6, 296/187.12; 293/128
See application file for complete search history.

(56) References Cited

U.S. PATENT DOCUMENTS

| | | | | |
|---|---|---|---|---|
| 4,172,603 A * | 10/1979 | St. Clair et al. | ............... | 280/734 |
| 4,809,555 A * | 3/1989 | Kunz | ............... | 73/727 |
| 4,995,639 A * | 2/1991 | Breed | ............... | 280/735 |
| 5,179,256 A * | 1/1993 | Haglund | ............... | 200/52 R |
| 5,231,253 A * | 7/1993 | Breed et al. | ............... | 200/61.45 R |
| 5,307,896 A | 5/1994 | Taguchi et al. | | |
| 5,419,407 A * | 5/1995 | Meyer et al. | ............... | 180/274 |
| 5,445,412 A * | 8/1995 | Gillis et al. | ............... | 280/735 |
| 5,544,716 A * | 8/1996 | White | ............... | 180/274 |
| 5,547,216 A | 8/1996 | Iwata et al. | | |
| 5,680,909 A * | 10/1997 | Lofy | ............... | 180/274 |
| 5,748,075 A * | 5/1998 | Dirmeyer et al. | ............... | 340/436 |
| 5,793,005 A * | 8/1998 | Kato | ............... | 200/61.45 R |
| 5,794,971 A * | 8/1998 | Boydston et al. | ............... | 280/733 |
| 6,135,493 A * | 10/2000 | Jost et al. | ............... | 280/730.2 |
| 6,209,908 B1 * | 4/2001 | Zumpano | ............... | 280/729 |
| 6,929,282 B1 * | 8/2005 | Zoratti et al. | ............... | 280/735 |
| 7,025,163 B2 | 4/2006 | Fuertsch et al. | | |
| 7,052,038 B2 * | 5/2006 | Breed et al. | ............... | 280/730.2 |
| 7,098,778 B1 * | 8/2006 | Zoratti et al. | ............... | 340/436 |
| 2006/0155504 A1 * | 7/2006 | Adam et al. | ............... | 702/138 |
| 2006/0236749 A1 * | 10/2006 | Wanami et al. | ............... | 73/12.09 |
| 2006/0266101 A1 * | 11/2006 | Takehara et al. | ............... | 73/12.09 |
| 2007/0000710 A1 * | 1/2007 | Hawes et al. | ............... | 180/274 |
| 2007/0007068 A1 * | 1/2007 | Weingaertner et al. | ............... | 180/274 |
| 2007/0045027 A1 * | 3/2007 | Nonaka et al. | ............... | 180/274 |
| 2007/0103283 A1 * | 5/2007 | Nonaka et al. | ............... | 340/436 |
| 2007/0114770 A1 * | 5/2007 | Wanami et al. | ............... | 280/735 |
| 2008/0238641 A1 * | 10/2008 | Mader | ............... | 340/436 |
| 2008/0249687 A1 * | 10/2008 | Le et al. | ............... | 701/45 |

(Continued)

FOREIGN PATENT DOCUMENTS

| | | |
|---|---|---|
| DE | 1 944 289 | 3/1971 |
| DE | 42 26 869 | 2/1993 |

(Continued)

Primary Examiner — Darnell Jayne
Assistant Examiner — Sasha T Varghese
(74) Attorney, Agent, or Firm — Gerald E. Hespos; Michael J. Porco; Matthew T Hespos

(57) ABSTRACT

An impact detection arrangement for a motor vehicle has at least one pressure body in a side door region of the motor vehicle. The at least one pressure body is connected to a pressure sensor via a connecting line. Additionally, the at least one pressure body is provided in an impact region that is relevant to a fixed pole side crash test, and is adapted to this region.

15 Claims, 3 Drawing Sheets

U.S. PATENT DOCUMENTS

2009/0322117 A1 * 12/2009 Arvidsson et al. ......... 296/146.6

FOREIGN PATENT DOCUMENTS

| DE | 195 04 353 | 9/1995 |
| --- | --- | --- |
| DE | 196 02 990 | 8/1996 |
| DE | 100 62 427 | 7/2002 |
| DE | 101 18 780 | 10/2002 |
| GB | 2 374 186 | 10/2002 |

* cited by examiner

IMPACT DETECTION ARRANGEMENT

CROSS-REFERENCE TO RELATED APPLICATIONS

This application claims the benefit of German Patent Application No. 10 2008 017246.1, filed Apr. 4, 2008, the disclosure of which is incorporated herein by reference.

BACKGROUND OF THE INVENTION

1. Field of the Invention

The invention relates to an impact detection arrangement for a vehicle, having at least one pressure body in a side door region of the motor vehicle. The invention also relates to a motor vehicle equipped with such an impact detection arrangement.

2. Description of the Related Art

DE 100 62 427 A1 discloses a generic type of impact detection arrangement for a motor vehicle. The impact detection arrangement of DE 100 62 427 A1 has at least two pressure chambers arranged at different regions in or on the vehicle or at different positions in the same region in or on the vehicle. The pressure chambers are connected in pairs to a differential pressure sensor via connecting lines. The impact detection arrangement of DE 100 62 427 A1 is suitable for rapid side crash sensing and also for detecting roll over, flip over, a collision or an impact in the front or rear region or in other regions of the motor vehicle. The pressure chambers of the arrangement are arranged here in a left-hand or right-hand side door of the motor vehicle.

Pressure sensors have been used for some time to detect a side impact to a motor vehicle and to enable a triggering signal to be outputted in good time, for example, in a crash where the sill board is impacted. This occurs, for example, in a side impact of an off-road vehicle. These pressure sensors have been used in barrier impact tests and produce a strong signal at an early point in a barrier impact test that produces surface deformation of the outside door panel. These pressure sensors also are used in fixed pole side crash tests that usually are carried out with a pole that has a diameter of 300 mm in various X positions. However, the local deformation of the side door of the motor vehicle is not so pronounced in a fixed pole side crash test that a sufficiently steeply rising or strong pressure signal is made available. The reason for this occurrence is that the fixed pole side crash tests cause a low volume reduction of the side door in relation to the overall volume in the region between the outside door panel and the inside door panel.

The present invention is concerned with the problem of specifying an improved or at least a different embodiment for an impact detection arrangement of the generic type that can be used for reliably detecting different types of impact.

SUMMARY OF THE INVENTION

The invention provides at least one pressure body in a side door of a motor vehicle at or near an impact region that is relevant to a fixed pole side crash test, and connects the pressure body to a pressure sensor via a connecting line. The pressure body is adapted to the impact region of the fixed pole side crash test and is capable of reliably detecting such a fixed pole side crash.

The pressure body may be an easily deformable pressure sheath, such as a compressible pressure sheath.

The detection signal is conducted from the pressure body via a connecting line to the pressure sensor. The pressure sensor may be operative to generate a triggering signal, for example, a triggering signal for a thorax side airbag.

The pressure body and the pressure sensor may define an integral unit.

The pressure sensor is already present in the vehicle. Therefore, it is possible to detect a side impact independently of the pressure body and to generate a triggering signal that may be used, for example, to activate the thorax side airbag in good time in types of crash in which the lateral sill board of the motor vehicle is impacted. This type of impact may occur, for example, in a side impact of an off-road vehicle.

The arrangement of the invention enables reliable detection of both a side impact of the barrier impact type and a side impact of a fixed pole side crash type. As a result, occupants of the motor vehicle are protected with good effect by triggering corresponding vehicle occupant protection systems, for example the above-mentioned thorax side airbag.

The at least one pressure body preferably is provided in the impact region that is relevant for the fixed pole side crash test. However, the at least one pressure body, of course, also optionally can be extended into other regions.

Certain detection of a fixed pole side crash is not reliably possible without the pressure body of the invention because the local deformation of the side door of the motor vehicle generated in a fixed pole side crash may not be of such a degree that a sufficiently steeply rising and strong pressure signal is made available for the pressure sensor. The arrangement of the invention also is advantageous in barrier impacts and vehicle impacts since at first only partial deformation takes place as a result of the bumper. This occurs because a fixed pole side crash reduces the volume of the side door a small amount in relation to the overall volume of the region between an inside door panel and an outside door panel.

The pressure bodies may, under certain circumstances, take into account pressure differences due to the geodetic pressure. Such pressure differences can lead to deformations attributable to the pressure difference between the internal pressure of the pressure body and the external geodetic pressure. In order to overcome this problem, at least one restrictor preferably is mounted on each pressure body to equalize the pressure. The restrictor preferably is arranged at the lowest point to take into account moisture or water. A second bore preferably is provided on the pressure body to ensure that the water drains into the door.

The at least one pressure body preferably is formed from plastic, and particularly from polytetrafluoroethylene (PTFE). Polytetrafluoroethylene, occasionally also referred to as polytetrafluoroethene, is a fully fluorinated polymer, better known under the commonly used trade name Teflon®. Generally, polytetrafluoroethylene belongs to the class of polyhalogenolefins and therefore to the thermoplasts even though it also has properties that require processing that is more typical for duroplasts. PTFE is generally extremely resistant to all known acids and bases, alcohols, ketones, benzines and oils and furthermore is not flammable. As a result of the high degree of resistance, such a pressure body can remain in the side door of a motor vehicle over its entire service life and only has to be replaced if corresponding accidents occur. Furthermore, such a pressure body can be manufactured cost-effectively from plastic and is adapted extremely easy to an external shape, to the region that is relevant for the fixed pole side crash test.

The invention also relates to a branching element, and preferably a Y-shaped branching element. The branching element preferably is provided in the connecting line between the pressure body and the pressure sensor. One output of the branching element preferably is connected to the pressure sensor, and one of the inputs of the branching element preferably is connected to the pressure body. The second input communicates with a pressure space of the vehicle door that lies between an inside door panel and an outside door panel. The branching element also preferably has a non-return valve. This embodiment permits reliable differentiation between types of barrier impact tests and types of fixed pole impact tests in terms of their impacts and maximum pressure values. In particular, the relatively great pressure volume that is present in the side door of the vehicle, in addition to the pressure body, enables reliable detection of a side impact. As a result, extremely effective protection of vehicle occupants can be implemented.

A valve device, such as an overpressure valve that opens at and above a predefined pressure, preferably is provided in the vicinity of at least one pressure body or in the vicinity of a connecting line to the pressure sensor. The valve device makes it possible to ensure that the pressure present in the pressure body does not lead to excessive deformation of the inside door panel or of inside door trim and therefore press the latter into the passenger compartment. Such a deformation could have adverse effects, for example for the thorax side airbag function. The valve device ensures that pressure is let out of the pressure body automatically as soon as there is the risk of the pressure body pressing the inside door trim into the passenger compartment of the vehicle beyond a permissible degree. The valve device therefore permits continuously satisfactory unfolding of the thorax side airbag and hence provides particularly effective protection of the vehicle occupants.

Further important features and advantages of the invention emerge from the drawings and from the associated description of the figures with reference to the drawings.

Of course, the features mentioned above and explained below can be used in the specified combination and also in other combinations or alone without departing from the scope of the invention.

Preferred exemplary embodiments of the invention are illustrated in the drawings and explained in more detail in the following description. Identical reference symbols are used for identical, similar or functionally identical components.

DETAILED DESCRIPTION OF THE PREFERRED EMBODIMENTS

Figure 1:
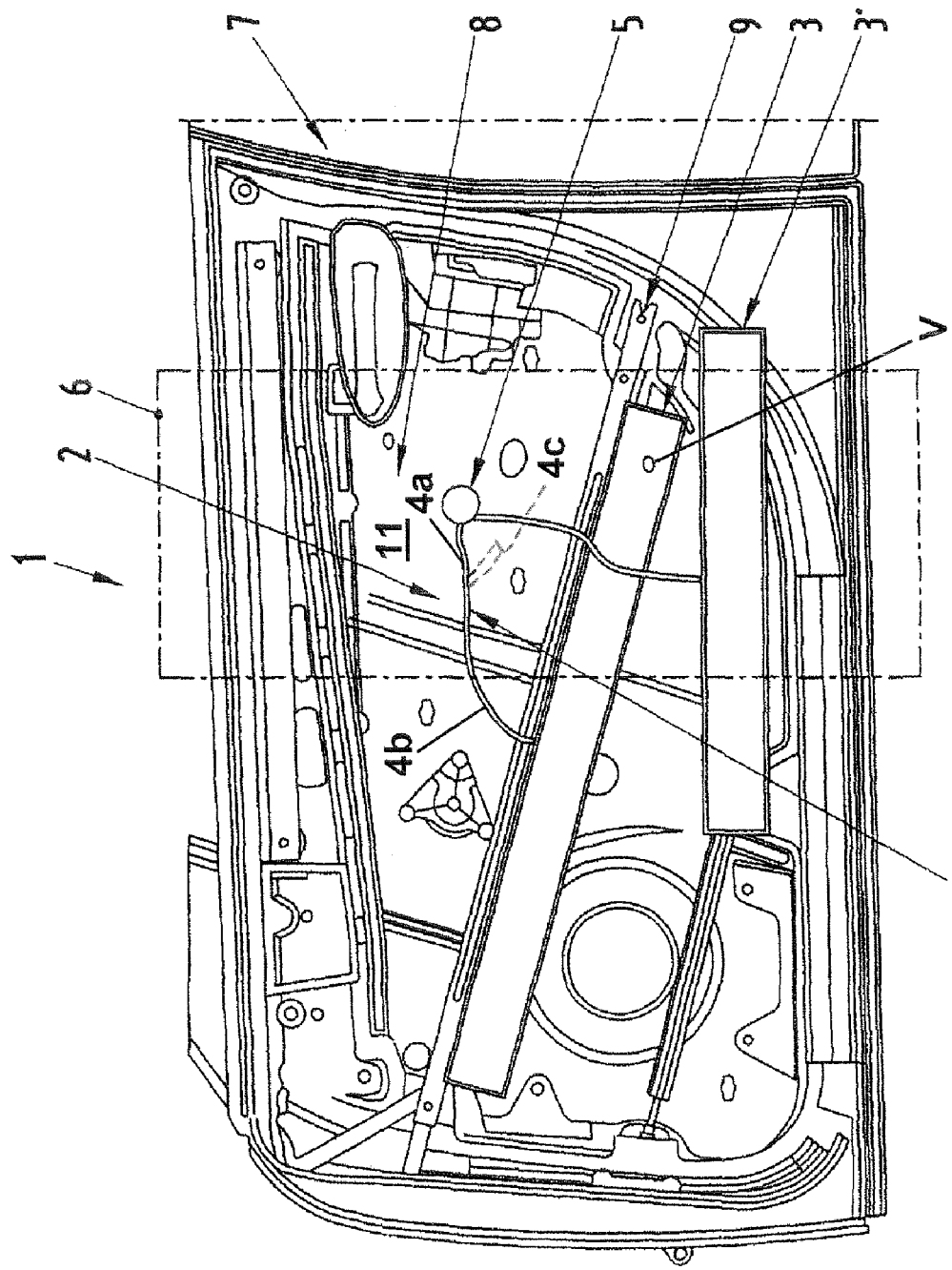
FIG. 1 shows an arrangement according to the invention in a side door of a motor vehicle.
Figure 3B:
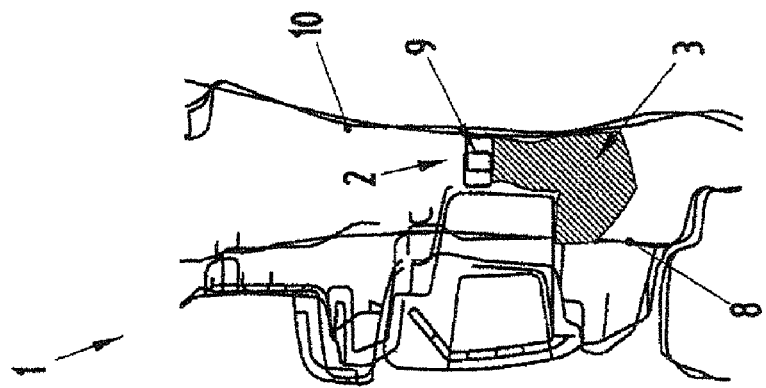
FIG. 3b shows an illustration, as in FIG. 3b, but during and after a side impact.
Figure 3A:
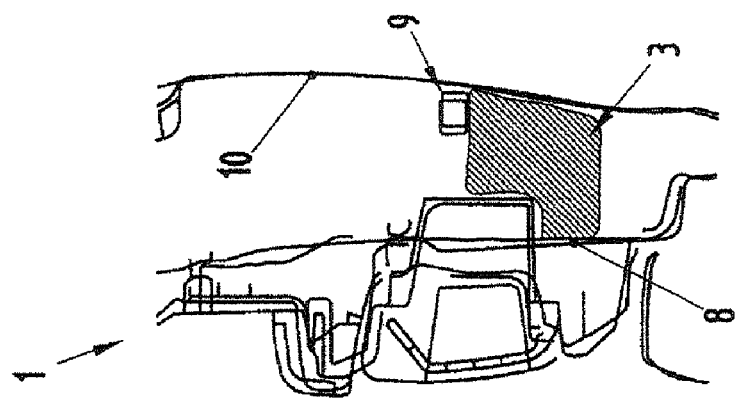
FIG. 3a shows a sectional illustration through a side door in the vicinity of a pressure body before a side impact.

An impact detection arrangement in accordance with the invention is provided in a side door 1 of a motor vehicle and is identified generally by the numeral 2 in FIG. 1. The arrangement 2 has at least one pressure body 3 and is shown in two different alternative positions in FIG. 1. The pressure body 3 is connected to a pressure sensor 5 via a corresponding connecting line 4 and is therefore able to transmit a pressure signal to the pressure sensor 5 in the event of a side impact that deforms the pressure body 3. The pressure body 3 is provided in an impact region 6 that is relevant for a fixed pole side crash test and/or is adapted to this region 6. More particularly, the impact region 6 extends along the vertical extent of the side door 1 from the side window to the bottom of the side door 1 at a position substantially adjacent to and forward of the door handle. Hence, the arrangement 2 can reliably detect both a conventional side impact and a fixed pole side crash. The side door 1 is of generally conventional design and has a door frame 7, an inside door panel 8, an outside door panel 10 and a side rail 9 between the inside and outside door panels 8 and 10, as shown in FIGS. 3a and 3b.

The pressure body 3 extends transversely and/or diagonally over the impact region 6, as shown in FIG. 1, so that a fixed pole side crash can be detected reliably. In contrast, the pressure sensor 5 can detect a conventional side impact in which a lateral sill board of the motor vehicle is impacted, as is the case, for example, in a side impact of an off-road vehicle. Furthermore, the pressure sensor 5 can reliably detect deformation of the outside door panel 10 over an area. As a result, a strong signal can be made available at an early point, and, for example, can trigger a vehicle occupant protection device, such as a thorax side airbag.

The pressure body 3 preferably is formed from plastic, in particular from polytetrafluoroethylene (PTFE) to achieve several advantages, including cost-effectiveness and extreme flexibility in shape. The pressure body can, of course, also be fabricated from metal. This permits extremely easy adaptation of the external shape of the pressure body 3 to the impact region 6, which is relevant for the fixed pole side crash test.

Two pressure bodies 3 can be provided so that each of pressure bodies 3 are connected to the pressure sensor 5 via a connecting line (not shown) to increase the detection sensitivity and to sense individual relevant regions 6 better. In this context, the pressure bodies 3 may have different volumes. On the other hand, a single pressure body 3 can be provided and may be connected to the pressure sensor 5 via the connecting line 4, with a branching element that preferably has a Y-shape with an output 4a and first and second inputs 4b and 4c. The branching element is arranged in the connecting line 4 between the pressure body 3 and the pressure sensor 5. The output 4a of the branching element is connected to the pressure sensor 5. The first input 4b is connected to the pressure body 3 and the second input 4c is connected in a communicating fashion to a pressure space that lies between the inside door panel and an outside door panel 10. The Y-shaped branching element also has a non-return valve in the output 4a. Three different methods of triggering can be differentiated if a side impact occurs with such an embodiment of the arrangement 2. On the one hand, a vehicle occupant protection system may be triggered, for example, by a signal transmitted from the pressure body 3 to the pressure sensor 5 or by means of the pressure sensor 5 itself. Furthermore, deformation of the outside door panel 10 can raise pressure in the space between the inside and outside door panels 8 and 10. This rise in pressure is transmitted to the pressure sensor 5 via the second input 4c of the Y-shaped branching element and causes the pressure sensor 5 to trigger the vehicle occupant protection system.

A valve device V is provided in the vicinity of at least one pressure body 3 or in the vicinity of a connecting line 4 to the pressure sensor 5. The valve device V is operative to open at and above a predefined pressure and is provided in view of the fact that the pressure body 3 is only compressible to a certain degree when a side impact occurs. Thus, the valve device V prevents a situation where forces of a side impact on the pressure body 3 cause an inside door trim to bulge inward in a way that could prevents satisfactory unfolding of a thorax side airbag. The valve device may be an overpressure valve and opens immediately in this context if the pressure in the pressure body 3 or in the connecting line 4 is of such a magnitude that there is a risk of deformation of the inside door panel 8 or an inside door trim.

The pressure body 3 preferably is attached to the outside door panel 10, to a door guide rail 9 and/or to the inside door panel 8 by means of a screw connection, a clip connection and/or a bonded connection. Thus, the pressure body 3 is secured reliably in the side door 1.

The at least one pressure body 3 preferably is elongated, as shown in FIG. 1, and is disposed to cross through both a region 6 that is relevant for the fixed pole side crash test and through a region that is relevant for the side crash test and/or is adapted to these regions. FIG. 1 shows two pressure bodies 3, 3' that can be used in combination or that can represent alternative positions selected in accordance with the particular vehicle. The arrangement shown in FIG. 1 can reliably detect a wide variety of types of side impacts. Both alternatives show the pressure body 3, 3' between the inside and outside door panels 8 and 10 at a position below the door guide rail 9.

The pressure body 3 is represented as a hatched area in the cross section of the side door 1 shown in FIG. 3*a*. More particularly, the pressure body 3 of FIG. 3*a* is beneath the door guide rail 9 and extends between the inside and outside door panels 8 and 10. The outside door panel 10 will be deformed in the direction of the inside door panel 8, as shown in FIG. 3*b*, if a side impact occurs against the side door 1. This deformation inevitably compresses the pressure body 3 and therefore increases the pressure therein. The rise in pressure is sensed by the pressure sensor 5, and the pressure sensor 5 will trigger the vehicle occupant protection system if the strength of the sensed signal is sufficiently high.

Figure 2:
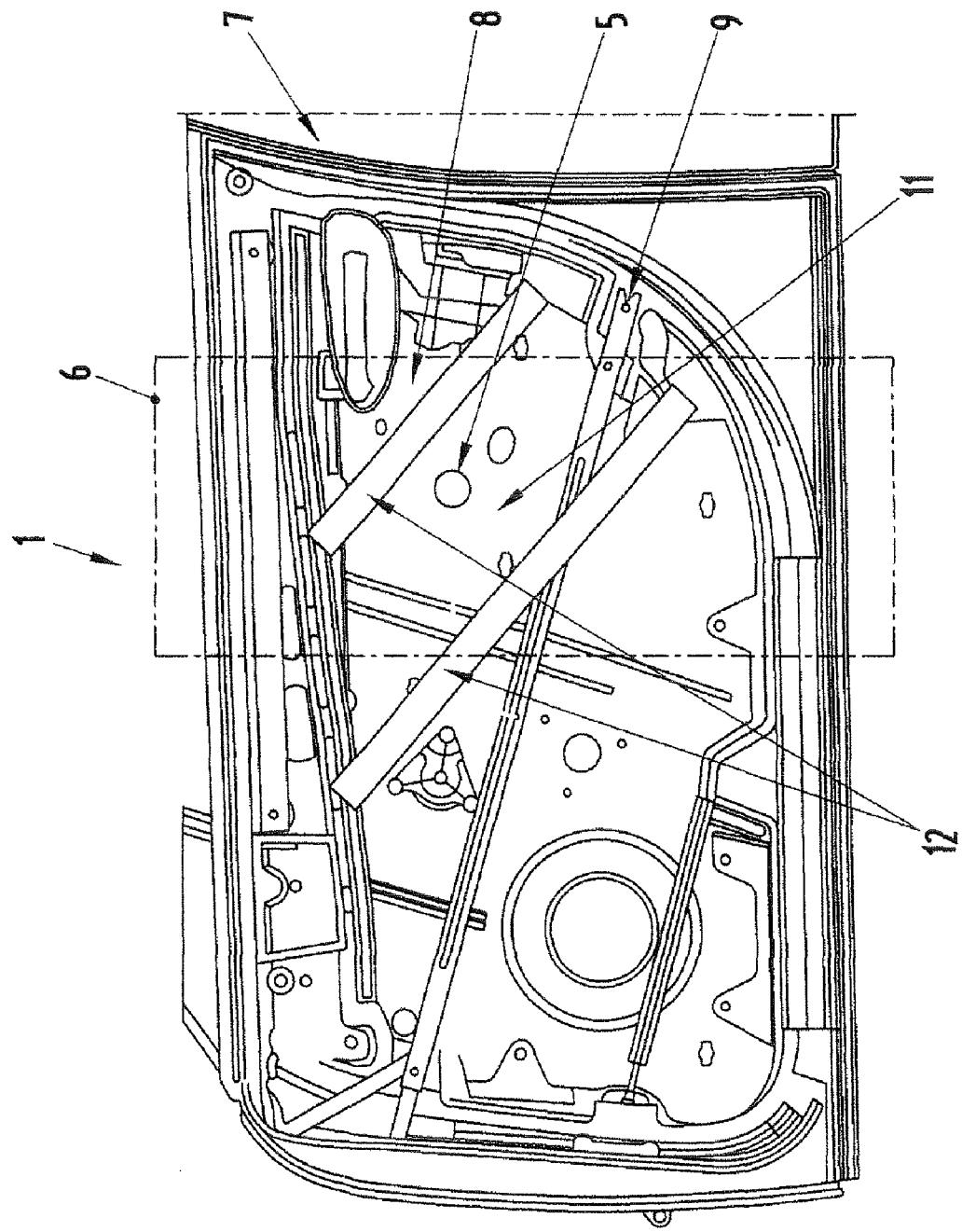
FIG. 2 shows an illustration as in FIG. 1, but with volume-separating elements for reducing an internal volume, determining the triggering of a pressure sensor, in a side door.

According to FIG. 2, a volume 11 provided for the triggering the pressure sensor 5 is reduced by installing two volume separating elements 12 in the side door 1. The two volume separating elements 12 may be embodied here as cost-effective plastic elements, such as foamed plastic elements. Furthermore, the volume separating elements 12 are embodied to be compressible in a way that when the outside door panel 10 is deformed, the inside door panel 8 is not deformed as a result of force being transmitted via the volume separating elements 12. The volume separating elements 12 therefore merely have the function of reducing the volume 11, which is relevant for triggering of the pressure sensor 5.

What is claimed is:

1. An impact detection arrangement for a motor vehicle, comprising: a pressure sensor and at least one elongate pressure body connected to the pressure sensor via a connecting line, the at least one elongate pressure body being disposed in an impact region of a side door of the motor vehicle and extending diagonally across said region, the pressure sensor being operative to generate a signal to trigger a vehicle occupant protection device, a Y branching element in the connecting line between the at least one pressure body and the pressure sensor, the Y branching element having an output connected to the pressure sensor, a first input connected to the pressure body and a second input configured to communicate with a pressure volume between an inside door panel and an outside door panel of the side door, a valve configured to communicate with the at least one pressure body or the connecting line, the valve being operative to open at and above a predefined pressure to prevent an inward deformation of the inside door panel in a way that could prevent deployment of the vehicle occupant protection device.

2. The arrangement of claim 1, wherein the at least one pressure body is formed from plastic.

3. The arrangement of claim 2, wherein the plastic is polytetrafluoroethylene.

4. The arrangement of claim 1, wherein the Y branching element has a non-return valve.

5. The arrangement of claim 1, wherein the at least one pressure body is connected to the outside door panel, a door guide rail or the inside door panel.

6. The arrangement of claim 5, wherein the at least one pressure body is connected by a bolt, a clip or bonding.

7. The arrangement of claim 1, further comprising at least one volume-separating element provided inside the side door to reduce the pressure volume that is responsible for triggering the pressure sensor, the volume-separating element being formed from a compressible foamed plastic to substantially inhibit inward deformation of the inside door panel in response to an impact on the side door.

8. The arrangement of claim 1, characterized in that two pressure bodies are provided in the side door, the pressure bodies each being connected to the pressure sensor via a connecting line.

9. The arrangement of claim 8, characterized in that the two pressure bodies have volumes of different sizes.

10. The arrangement of claim 1, characterized in that the at least one pressure body is an elongate pressure chamber that crosses the impact region.

11. A motor vehicle having the impact detection arrangement of claim 1.

12. An impact detection arrangement configured to detect an impact at a side door of a motor vehicle, the side door having inner and outer panels defining a pressure volume therebetween, the arrangement comprising:
   an elongate deformable pressure body extending diagonally across the pressure volume of the side door from an upper position to a lower position and abutting at least one of the inner and outer panels;
   a pressure sensor in the pressure volume of the side door;
   a connecting line having an output connected to the pressure sensor, a first input connected to the pressure body and a second input connected to parts of the pressure volume external of the pressure body, a non-return valve in communication with the output so that a change in volume of the pressure body or in the pressure volume generates a pressure change that is detectable by the pressure sensor; and
   a valve configured to communicate with the pressure body or the connecting line, the valve being operative to open at and above a predefined pressure, to prevent an inward deformation of an inner panel of the side door in a way that could prevent deployment of the vehicle occupant protection device.

13. The arrangement of claim 12, wherein the pressure body is formed from plastic.

14. The arrangement of claim 12, characterized in that two pressure bodies are provided in the side door, the pressure bodies each being connected to the pressure sensor via a connecting line.

15. The arrangement of claim 14, characterized in that the two pressure bodies have volumes of different sizes.

* * * * *